Oct. 28, 1969  G. C. SMITH  3,474,639

AIR CONDITIONER CONTROL SYSTEM

Filed June 15, 1967

INVENTOR
GERALD C. SMITH

BY Kenyon, Palmer, Stewart & Estabrook
ATTORNEYS

United States Patent Office 3,474,639
Patented Oct. 28, 1969

3,474,639
AIR CONDITIONER CONTROL SYSTEM
Gerald C. Smith, San Antonio, Tex., assignor to Friedrich Refrigerators, Inc., San Antonio, Tex., a corporation of Texas
Filed June 15, 1967, Ser. No. 646,286
Int. Cl. G05d 23/30; F25d 17/06; F25b 13/00
U.S. Cl. 62—160          8 Claims

ABSTRACT OF THE DISCLOSURE

A thermostatically controlled air conditioner of the compressor-condenser-evaporator refrigerant circuit type is selectively operable in either of two modes. In the first mode the fan and the compressor are cycled in phase with each other in response to the ambient temperature of the space to be cooled while in the second mode, the fan operates continuously during cycling of the compressor. A heat anticipator in heat exchange relation with the thermostat control is effective to change the sensitivity of the control depending upon which mode of operation is selected. The same basic type of control arrangement is used when the air conditioner is also used for heating whether it is a reverse cycle heat pump type or whether other heating means are incorporated therein.

Background of the invention

The present invention relates to thermostatically controlled air conditioning units. The term "air conditioning" is to be used in this specification in its generic sense to include both heating and cooling units whether the heat is furnished by a reverse cycle heat pump or whether auxiliary heating means are employed in the combined unit for this purpose.

Air conditioners of the prior art conventionally employ thermostat controls for cycling the compressor of a compressor-condenser-evaporator refrigerant circuit type unit in accordance with the ambient temperature of the space to be conditioned. It is also known in the prior art to modify the standard thermostat control with a heat anticipating means which effectively renders the thermostat more sensitive to ambient temperature changes and therefore results in improved comfort to persons occupying the conditioned space. An example of apparatus using such heat anticipation controls may be found in the U.S. patent to Carlson 2,978,228.

It is the principal object of the present invention to provide a heat anticipator type of thermostat control for an air conditioner unit in which the sensitivity of the thermostat is effectively increased for one mode of operation over that for another with the end result that the comfort sensation is vastly improved. Another object of the present invention is to provide a two-mode operation for air conditioners so that in one mode the fan which circulates ambient air over the evaporator in a cooling system or the condenser or auxiliary heater in a heating system is either operated continuously or cycled on and off in phase with the compressor in response to ambient temperature of the space to be heated or cooled.

Other objects of the present invention will be apparent from the detailed description which appears hereinafter.

Summary of the invention

In general, the objects of the present invention are achieved in a cooling air conditioner of the compressor-condenser-evaporator refrigerant type by providing a manually operable switch which in one position permits the evaporator fan to operate continuously while the compressor is cycled on and off in response to ambient temperature of the space to be cooled and in another position permits the fan to cycle on and off in phase with the compressor. Additionally, a heat anticipator in the form of an electrically heated resistance unit is placed in heat exchange relation with the thermostat in order to increase the sensitivity of the thermostat during cycling operation of the evaporator fan. The same basic concept may be applied to a heat pump air conditioner of the reverse cycle type which can be used for either heating or cooling. The same basic control system may be applied where the heating function is derived from some auxiliary heating means incorporated in the heat pump unit as well as a unit of the reverse cycle type.

Detailed description of drawings

Figure 1:
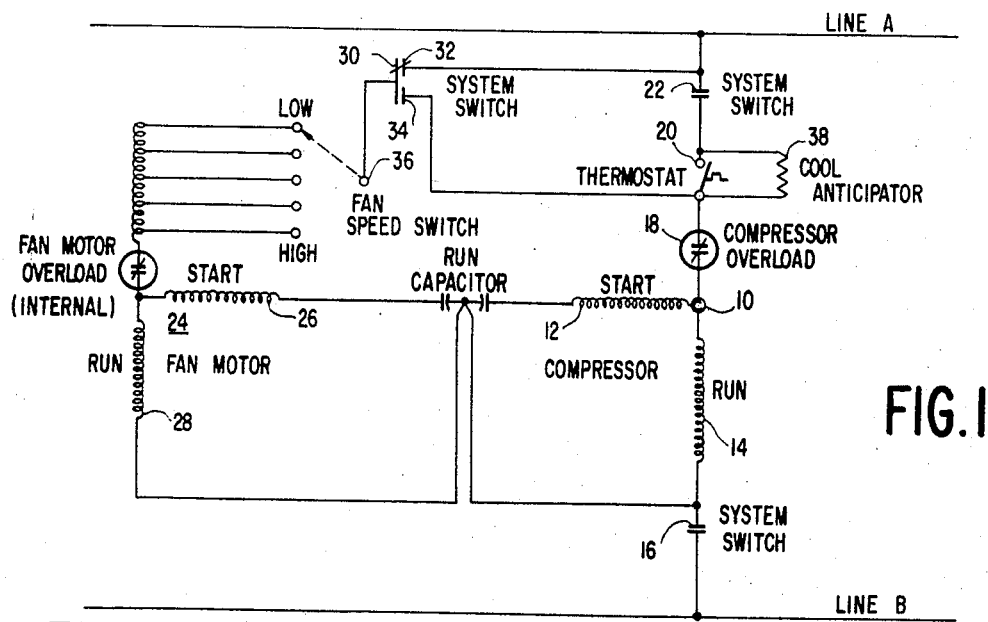
FIGURE 1 is a schematic wiring diagram for a cooling air conditioning unit embodying the control system of the present invention.

Referring first to FIGURE 1 which is a schematic wiring diagram for a straight cooling unit embodying a control system in accordance with the present invention, the compressor 10 with its start and run windings 12 and 14 is shown connected across the power supply lines A and B through the system switch contacts 16, and a compressor overload switch 18, the thermostat 20 and contact 22 of the system switch. Likewise, the fan motor 24 with the usual start and run windings 26 and 28 is also connected between the lies A and B. With contacts 30 and 32 of the system switch closed and contacts 30 and 34 open, the fan will be connected directly across the lines through the fan speed switch 36 and will therefore run continuously regardless of the cycling of the compressor motor by the thermostat 20 in accordance with ambient temperature of the space to be cooled. On the other hand, the system switch may be positioned so as to open contacts 30 and 32 and close contacts 30 and 34 in which event both the fan and the compressor are cycled on and off in response to the thermostat 20 which is positioned to sense the ambient temperature of the return air to the evaporator from the space to be cooled. The actual location of the thermostat together with the heat anticipator is not particularly critical so long as it is out of the direct discharge of air from the evaporator. Generically, its location can probably best be described as being upstream of the evaporator in terms of the air flow over the evaporator.

In order to to increase the comfort sensation of the user of apparatus of this type, means are provided for effectively rendering the thermostat 20 more sensitive during cyclical operation of the fan in comparison to the sensitivity of the same thermostat when the fan is operated continuously. Such means is indicated schematically in this figure by the electrical resistance heater 38 which in practice is placed in heat exchange relation with the bimetal portion of the thermostat 20. The thermostat 20 closes its contacts on a rise in ambient temperature of the space to be cooled. The resistance heater 38 is energized when the thermostat contacts are open and this produces an amount of heat at a temperature above the room ambient which serves to anticipate the room temperature rise by closing the contacts of the thermostat sooner than would be the case without the heater. This effectively reduces the length of off time and therefore of room temperature differential. During periods when the thermostat contacts are closed, the heater is deenergized so that at this point the bimetal element of the thermostat is exposed solely to the influence of ambient air to cause reopening of the contacts in response to a predetermined reduction in room air temperature. This complete cycle serves to reduce the overall room differential and therefore improves the human comfort sensation during the cooling cycle.

Whenever the fan is cycled with the compressor, better humidity control is achieved because the fan is not evaporating condensate from the evaporator coils into the space to be cooled. This, however, requires more accurate thermostatic control of the compressor to maintain the highest possible comfort sensation and the heat anticipator accomplishes this result. When the fan runs continuously, heat is taken away from the heat anticipator so rapidly that the thermostat acts as through the heat anticipator were deenergized. The cycling of the compressor under these conditions is therefore reduced.

Figure 2:
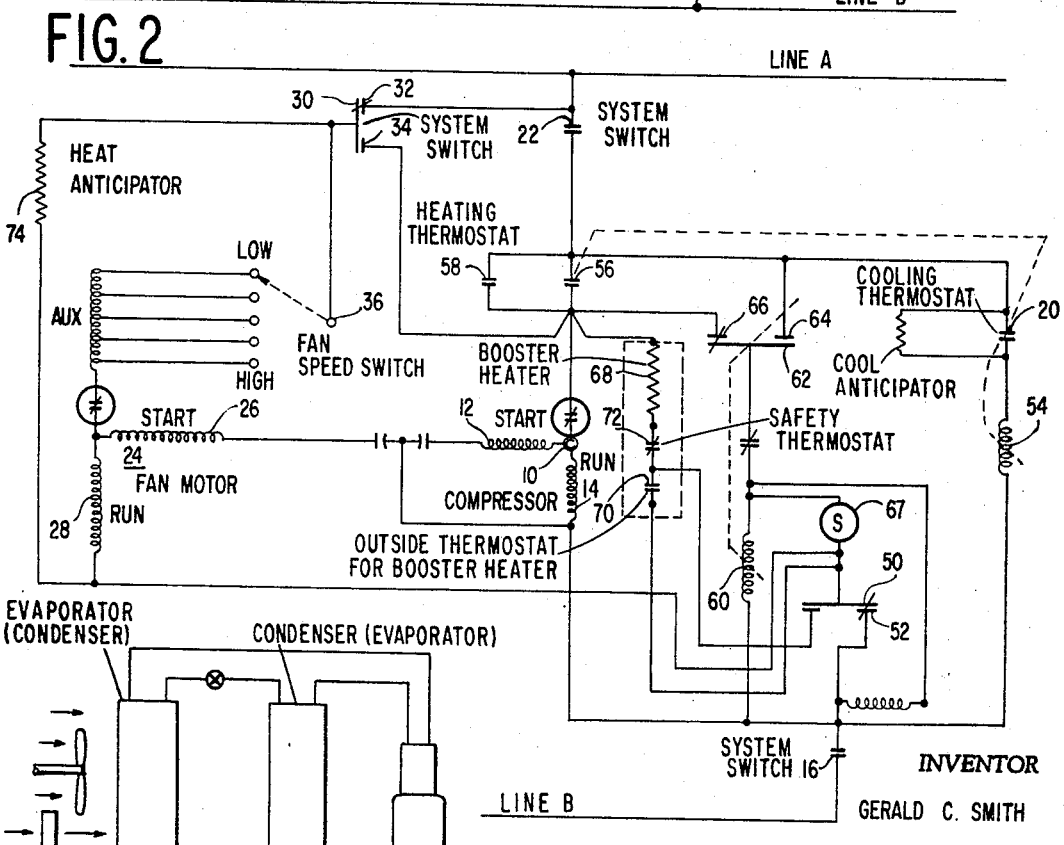
FIGURE 2 is a schematic wiring diagram for a reversible heat pump utilizable for either heating or cooling and embodying a control system in accordance with the present invention.
Figure 3:
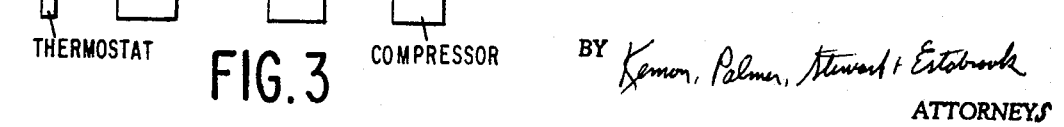
FIGURE 3 discloses the physical relationship between the thermostat and the refrigeration components.

Turning now to FIGURE 2 of the drawings, this shows in schematic form the application of the same basic principles as described with reference to FIGURE 1 to a reversible heat pump useful for both heating and cooling operations. Parts which are identical in FIGURES 1 and 2 have been assigned the same reference numerals.

Energy from the lines A and B is supplied to the fan motor 24 through its start and run windings 26 and 28 by closing the system switch contacts 16. It will be noted that the circuit to the run winding 28 of the fan motor is completed through contacts 50 and 52 of a deicing control which will be described hereinafter. When the fan motor comes up to speed, the system switch is again manually operated to close contacts 22 in order to energize the compressor through its start and run windings 12 and 14. If the system switch is further positioned so that the contacts 30 and 32 are closed as shown in this figure, the fan is then energized to operate continuously while the compressor is permitted to cycle under the control of either a cooling or a heating thermostat. In this embodiment, the cooling thermostat 20 when closed in response to a predetermined rise in ambient tempearture energizes the cooling relay coil 54 which in turn closes its contacts 56 to complete the circuit through the compressor motor across the lines A and B. As has been described with reference to the cooling unit of FIGURE 1, a further position of the system switch which opens contacts 30 and 32 and closes contacts 30 and 34 is effective to permit the fan to cycle on and off in phase with the compressor. Also as described with reference to FIGURE 1, the fan speed is adjustable by positioning of the switch 36.

When in the cooling mode of operation therefore, the thermostat 20 cycles the contacts 56 open and closed in response to room temperature.

During the heating mode of operation in which the functions of the evaporator and condenser are reversed, the cycling of the compressor in response to ambient temperature is automatically placed under the control of the thermostat 58. As soon as the contacts 58 are closed in response to a predetermined drop in ambient temperature, a latching relay 60 is energized to close its contacts 62 and 64 and open its contacts 62 and 66. This therefore maintains the latching relay 60 in an energized condition regardless of the opening or closing of the thermostat contacts 58. This latter arrangement is necessary to prevent operation of the solenoid reversing valve 67 during the time that the heating thermostat contacts 58 are open.

To supplement the heat supplied by the heat pump during heating cycles, a booster electrical heater 68 is also included and the operation of this electrical heater is under the direct control of an outside thermostat 70 as well as a safety thermostat 72.

An automatic deicing control is also incorporated in this unit. This is a time temperature device which controls the outdoor coil defrosting by energizing the reversing valve solenoid 67 in response to pre-set time cycles. The fan motor is also deenergized during the deicing cycle and the cycle is terminated in response to an integral temperature device which is part of the deicing control unit.

As in the case of the cooling unit as described with reference to FIGURE 1, an anticipator 38 is disposed in heat exchange relation to the bimetal element of the thermostat 20 and its operation in this unit is identical to that described with reference to FIGURE 1. A similar anticipator 74 is placed in heat exchange relation with the bimetal of the heating thermostat 58 but the function is somewhat different from that of the anticipator 38. First of all, it will be noted that the anticipator 74 remains energized irrespective of the open or closed condition of the contacts of the heating thermostat 58 and it is energized at all times when the fan is energized. In the automatic mode of heating operation therefore which corresponds to having the fan cycle on and off in phase with the compressor, as soon as the fan is deenergized the air flow over the heating thermostat 58 becomes static and anticipator heat is removed thus contributing to a lower effective differential requiring only a small amount of further room heat decrease to cause the thermostat to reclose its contacts. In the continuous fan operation mode, however, the anticipator remains a constant factor in both the on and off cycles and in that case it is only the room temperature differential which determines the thermostat operation. Since the anticipator function cycles with the fan, it must be of a higher rating then the cooling anticipator.

From the foregoing it will be apparent to those skilled in this art that there is herein shown and disclosed a new and useful control system for either cooling or combined heating and cooling units of the air conditioning type. While specific embodiments have been herein shown and described, they are intended to be for illustrative purposes only.

I claim:

1. In an air conditioning system of the type including a compressor-condenser-evaporator refrigerant circuit, control means comprising:
    thermostatic control means having contacts in series with the compressor for cycling the compressor in response to ambient temperature in the space to be cooled;
    a fan for circulating air over the evaporator;
    means selectively actuable for either cycling said fan in phase with said compressor or for running said fan continuously;
    and heat anticipator means in heat exchange relation with said thermostatic control means for rendering said thermostat more sensitive during cycled fan operation than during continuous fan operation, said heat anticipator means and thermostatic control means being positioned upstream of the evaporator with respect to air flow over the evaporator.

2. The combination defined by claim 1 in which said heat anticipator means comprises an electrically energized resistance heater connected across said contacts of said thermostat so as to be energized only when said contacts are open.

3. The combination defined by claim 1 in which said heat anticipator means comprises an electrically energized resistance heater connected across said contacts of said thermostat control means so as to be energized only when said contacts are open corresponding to off cycle periods of the compressor.

4. In a heat pump heating system of the type which includes a compressor-condensor-evaporator refrigerant circuit, a control system comprising:
    thermostatic control means having contacts in series with the compressor for cycling the compressor in response to ambient temperature in the space to be heated;
    a fan for circulating air over the condenser;
    means selectively actuable for either cycling said fan in phase with the compressor or for causing continuous operation of said fan;

and heat anticipator means in heat exchange relation with said thermostat control means for rendering said control means more sensitive during cycling operation of said fan than during continuous operation of said fan, said heat anticipator means and said thermostatic control means being positioned upstream of the condenser in terms of the air circulated over the condenser.

5. The combination defined by claim 4 in which said heat anticipator means comprises an electrically energized resistance heater and in which energy is supplied to said heater only when said fan is running.

6. In a heat pump air conditioner of the compressor-condenser-evaporator refrigerant circuit type and in which the function of the condenser and evaporator are reversible for heating or cooling, a control system comprising:

a heat exchanger operable as an evaporator for cooling or as a condenser for heating, positioned in the space to be heated or cooled;

a fan for circulating air from the space to be heated or cooled over said heat exchanger;

means selectively actuable for either cycling said fan with the compressor or for running said fan continuously;

first thermostatic control means having contacts in series with the compressor for cycling the compressor in accordance with ambient temperature during the cooling mode of operation of the heat pump;

first heat anticipator means in heat exchange relation with said thermostatic control means for rendering said thermostat more sensitive during cyclical operation of said fan than during continuous fan operation;

second thermostatic control means having contacts in series with the compressor for cycling the compressor in accordance with ambient temperature of the space to be heated during the heating mode of operation of the heat pump; and second heat anticipator means in heat exchange relation with said second thermostatic control means for rendering said thermostat more sensitive during cyclical operation of said fan than during continuous operation of said fan.

7. The combination defined by claim 6 in which both said heat anticipator means comprise electrically energized resistance heaters.

8. The combination defined by claim 6 in which both said thermostatic control means and both said heat anticipator means are positioned in the return flow of air to said heat exchanger whereby when said fan is cycled with the compressor, said thermostatic control means are rendered more sensitive than during continuous fan operation which renders said heat anticipator means relatively ineffective.

References Cited
UNITED STATES PATENTS

| | | | |
|---|---|---|---|
| 3,034,314 | 5/1962 | Canter | 62—180 |
| 3,111,010 | 11/1963 | Spofford | 62—202 XR |
| 3,174,297 | 3/1965 | Kuhn | 62—180 XR |

MEYER PERLIN, Primary Examiner

U.S. Cl. X.R.
62—181, 202, 226